United States Patent Office 3,736,149
Patented May 29, 1973

3,736,149
STABILIZED FLAVORING COMPOSITIONS
William A. Knapp, Matawan, N.J., assignor to Monsanto Company, St. Louis, Mo.
No Drawing. Filed Nov. 9, 1970, Ser. No. 88,244
Int. Cl. A23l 1/00, 1/04, 1/20
U.S. Cl. 99—78
13 Claims

ABSTRACT OF THE DISCLOSURE

Stabilized flavoring compositions comprising a flavoring agent fixed in a matrix material comprising lactose, hydrocolloid gum and a starch hydrolysate. Processes for preparing stabilized flavoring compositions and dry-mix food products containing same.

---

The present invention relates to stabilized flavoring compositions, methods of preparing them and dry-mix type food products containing them.

It is well known that the aroma and flavor of many food products are their most valued characteristics and are essential to their successful merchandising. This importance has led to the concentration of aroma and flavor bearing substances, the natural concentrates of volatile oils of fruits or other food materials being manifest products of such efforts. With these natural concentrates it has been possible to add attractive and appealing characteristics to otherwise odorless or flavorless materials.

With the advent of goods in package form, many food products were reduced to a sensibly dry condition for convenience and stability during merchandising, and the above-mentioned natural concentrates have been incorporated into such dry-mix type food products in various ways known to the art and often by the simple expedient of thorough mixing. Unfortunately such dry-mix type food products often deteriorate rapidly during their "shelf-life" and lose their appeal because of the instability of the flavor and aroma bearing chemical constituents in the natural concentrates due to their reactivity and/or volatility in spite of the greatest care in the design, materials and sealing of the packages. To overcome this difficulty it has sometimes been proposed to add synthetic ingredients which have more powerful aromas or flavor and/or flavor enhancing properties; such addition of synthetic ingredients being commonly referred to as a "fortification" of the weaker natural concentrates. Although the strength of such synthetic ingredients is often very great, they do not have, except in special instances, markedly greater resistance to deterioration than the natural concentrates. What they add in intensity is often offset by their very great volatility and/or reactivity.

These natural concentrates and synthetic ingredients will be hereinafter referred to as "flavoring agents."

The art has long sought a means of stabilizing these flavoring agents for use in dry-mix type food products. This invention provides such a means.

Accordingly, the stabilized flavoring compositions of this invention comprise a flavoring agent fixed in a matrix material comprising lactose, a hydrocolloid gum and certain starch hydrolysates.

In general, the stabilized flavoring compositions of this invention can be prepared by a process comprising forming an aqueous solution comprising lactose, hydrocolloid gum, certain starch hydrolysates and the flavoring agent and subsequently drying the aqueous solution so that the flavoring agent is fixed in a solid matrix material comprised of the lactose, hydrocolloid gum and starch hydrolysate.

One of the most reactive and volatile flavoring agents utilized by the food industry is acetaldehyde. Accordingly, acetaldehyde will be utilized hereinafter as illustrative of the present invention but it should be understood that other flavoring agents can also be stabilized by means of the present invention.

It has been known for some time that acetaldehyde is an important flavor component of natural fruits and vegetables and serves as a flavor enhancer for the various flavor notes naturally present in meats, fruits and vegetables. Particularly, it has been found that acetaldehyde is very important in increasing the impact and freshness of certain flavors, such as fruit-type flavors. However, while the presence of acetaldehyde would provide valuable flavor and/or flavor enhancement in many food products it cannot be maintained in such products for any length of time without some form of stabilization because, as mentioned above, acetaldehyde is highly volatile and has a tendency to react with other compounds in the food products and to polymerize with itself. Many attempts have been made to stabilize acetaldehyde in various compositions, but most of these compositions have tended to be unstable and have lost substantially all of the acetaldehyde within several hours to one week thus providing no flavor and/or flavor enhancement after this period.

It is apparent, therefore, that the food industry would readily embrace an effectively stabilized acetaldehyde composition.

U.S. Pat. 3,314,803 illustrates an attempt to provide a stabilized acetaldehyde composition by forming a composition containing acetaldehyde and mannitol wherein the acetaldehyde is encapsulated in a matrix of mannitol solids. The amount of acetaldehyde that can be maintained stable in such a composition is described as "being present in a stable range of up to about 4% by weight of the total composition."

It has now been discovered that a stabilized acetaldehyde composition containing, in stabilized form, up to 6% or higher of acetaldehyde can be produced by fixing the acetaldehyde in a solid matrix material comprising lactose, a hydrocolloid gum and certain starch hydrolysates.

In general, the stabilized acetaldehyde compositions of this invention can be prepared by the process of this invention comprising forming an aqueous solution comprising lactose, hydrocolloid gum, starch hydrolysate, incorporating therein the acetaldehyde and subsequently drying the aqueous solution so that the acetaldehyde is fixed in a solid matrix material comprised of lactose, hydrocolloid gum and starch hydrolysate.

The amount of matrix material utilized should be sufficient to adequately contain the acetaldehyde. The amount of lactose present, based on the total weight of the lactose, hydrocolloid gum and starch hydrolysate in the stabilized acetaldehyde composition is from about 1 to about 85%, preferably from about 5 to about 50%.

The hydrocolloid gums useful in this invention are those water dispersible gums that are derived from natural or synthetic sources. Illustrative of these gums are such gums as pectin, tragacanth, locust bean and guar, the alginates such as sodium alginate and the propylene glycol alginates, the carrageenans, the cellulose gums such as carboxy methyl cellulose, and karaya. Of these, the preferred hydrocolloid gums are the propylene glycol alginates. The amount of hydrocolloid gum utilized is extremely small and should be from about 0.05 to about 2.0% and preferably from about 0.3 to about 1.3% based on the total weight of the lactose, hydrocolloid gum and starch hydrolysate in the acetaldehyde composition.

The starch hydrolysates useful in this invention are those products having a Dextrose Equivalent (D.E.) of from about 5 to about 20 and preferably from about 7 to about 13 obtained by the hydrolysis of starches. (Dextrose Equivalent is a measure of the reducing-sugar content calculated as anhydrous dextrose and expressed as a percentage of the total dry hydrolysate as described and adopted by the Corn Industries Research Foundation, Inc.) The amount of starch hydrolysate to be utilized is from about 15 to about 98% and preferably from about 45 to about 95% based on the total weight of the lactose, hydrocolloid gum and starch hydrolysate in the stabilized acetaldehyde composition.

It has been found that the stabilized acetaldehyde compositions prepared by the process of this invention are not completely dry in the sense of removing all of the water in the matrix material. Although the stabilized acetaldehyde compositions are solid materials they do contain some small amount of water. The amount of water contained in the stabilized acetaldehyde compositions is directly dependent on the drying conditions utilized. It is preferred that no higher than about 5% water be retained in the stabilized acetaldehyde compositions as it has been found that those compositions that have higher levels of water tend to rapidly lose the acetaldehyde contained therein.

The process of this invention for preparing stabilized acetaldehyde compositions comprises forming an aqueous solution that contains from about 40 to about 65% and preferably from about 45 to about 60% by weight of the non-aqueous materials, i.e., the lactose, hydrocolloid gum, starch hydrolysate and the acetaldehyde. The ratios of lactose, hydrocolloid gum and starch hydrolysate utilized are as noted above for the stabilized acetaldehyde compositions. The amount of acetaldehyde utilized in the aqueous solution should be about 10% by weight of the total non-aqueous materials to obtain a 6% level of stabilized acetaldehyde in the resulting stabilized acetaldehyde compositions. It is obvious that if higher or lower levels of stabilized acetaldehyde are desired the amount of acetaldehyde utilized in the aqueous solution can be varied accordingly.

The resulting solution is then dried to form the stabilized acetaldehyde compositions.

The following procedure is illustrative of the process of this invention. Thirty parts of liquid acetaldehyde is mixed with 50 parts of an aqueous solution containing 2% by weight propylene glycol alginate (PGA). To the resulting solution is added 225 parts of an aqueous solution containing 33.4% lactose followed by the addition of 195 parts of 10 D.E. starch hydrolysate. The resulting solution and the solutions utilized above are maintained at about 55° F. so as to prevent undesirable boiling off of acetaldehyde (boiling temperature=68° F.). Other methods of preparing the aqueous solution may be utilized as long as the previously-noted concentrations are observed.

The resulting solution is then dried to a solid that comprises a matrix material of the lactose, PGA and starch hydrolysate that has the acetaldehyde fixed therein. In drying the solution to accomplish this result, it is a preferred feature of this invention to spray dry the solution, i.e., atomize the solution into discrete droplets which are dried in a fraction of a second to several seconds to thereby form a dry matrix material with the acetaldehyde fixed inside the matrix material. It appears that while acetaldehyde is highly volatile and very miscible in water, the water as it vaporizes and passes through the dry outer shell regions of the matrix material still leaves sufficient residual acetaldehyde to provide a stabilized acetaldehyde composition. Preferably, caution should be exercised with the solution prior to spray drying to prevent boiling off of the acetaldehyde. This can be done by keeping the temperature below 68° F. or by pressurizing the atmosphere above the solution.

Preferably, the atomizing device utilized in the spray dryer is a pneumatic two-fluid nozzle which forms droplets by spraying air against the liquid feed to atomize the solution into droplets. Other atomizing devices that can be utilized are the spinning disc and pressure nozzles.

The particle size of the droplets should be in the range of 10–300 microns and preferably below 200 microns, say 50–100 microns the term particle size being employed herein to connote the average particle size of those particles constituting the significant intermediate 80% weight fraction of particles plotted on a particle size distribution curve.

The drying temperatures used should be relatively mild, preferably in the range of 150°–300° F. inlet and 90°–170° F. outlet. The relatively small size of the droplets and the mild drying temperatures employed appear to enable the matrix material to form and trap a stable level of acetaldehyde. Preferably, the drying temperatures should be as low as possible and the particle size as small as possible. It is appreciated that as the particle size of the droplets is reduced the temperature of the drying air can be decreased.

The spray-dried composition will have initial fixation of about 6 to about 7% acetaldehyde by weight of the stabilized acetaldehyde composition. But this initial fix will be modulated in several days of storage at room conditions and the level of acetaldehyde will equilibrate to a stable range up to about 6%, usually between about 4 to about 6%.

While it is preferred to spray dry the solution under low temperature conditions, it is understood that any means may be employed for achieving a condition wherein the acetaldehyde is trapped in a matrix material composed predominantly of dried matrix material.

The stabilized acetaldehyde compositions of this invention may be employed as a flavor and/or flavor enhancer in many dry-mix type food products. For instance, it is particularly useful in the following formula for a fruit flavored dry beverage base.

FRUIT FLAVORED DRY BEVERAGE BASE

| Ingredients: | Grams |
|---|---|
| Sucrose | 16.0 |
| Citrus flavor | 0.04 |
| Citric acid | 0.080 |
| Stabilized acetaldehyde composition | 0.005 |

This dry beverage base provided an excellent juicy flavor characteristic when contacted with sufficient water to prepare a six ounce beverage.

The stabilized acetaldehyde compositions of this invention may also be used generally as flavor enhancers for developing meat, fruit and vegetable flavors in various other food applications.

This invention will now be described by reference to the following specific examples which are given for illustrative purposes only.

EXAMPLE 1

To a suitable vessel was charged 30 parts of liquid acetaldehyde that contained 50 parts of a 2% Kelcoloid S (a propylene glycol alginate; product of Kelco Company) aqueous solution. During the mixing of the materials the mass in the vessel was maintained at a temperature below 60° F. To the resulting mass was added 195 parts of Morrex 1918 (a 10–12 D.E. starch hydrolysate prepared from a high amylopectin-containing starch; a product of Corn Products Company) followed by the addition of 225 parts of an aqueous solution containing 33.4% lactose.

The lactose solution utilized above was prepared by heating 75 parts of α-lactose in 150 parts of water to a temperature of about 205° F. and then cooled to from about 50 to 60° F. immediately prior to use.

The resulting mass was thoroughly mixed and was then spray dried in a Bowen spray dryer using a flow rate of about 100 ml./min., a pneumatic nozzle at 40 p.s.i. with an inlet air temperature of about 220–230° F. and an outlet air temperature of about 140–150° F.

Samples of the spray-dried material were analyzed for acetaldehyde content which was determined to be 6.2%. The material was then subjected to an environment of 100°F. and about 10% R.H. in an open container in an oven for 4 weeks. This test is considered to be an adequately severe accelerated storage stability test. After 4 weeks the stabilized acetaldehyde compositions contained 4% acetaldehyde and thereafter remained stable.

Samples of the spray-dried material were left in open containers for 4 weeks at approximately 70° F. and 10% R.H. No significant change was found in the material during this time.

Samples of the spray-dried material were mixed in a formulated mix that included acid, flavor and sweetener and were stored in a polyethylene-aluminum foil package at 100– F. and 70% R.H. for 4 weeks. It was determined that the amount of acetaldehyde was still no lower than 4% in the acetaldehyde composition after this period.

Samples of the spray-dried material were stored in a sealed glass jar for one year and after this period still contained 5.5% acetaldehyde.

The stabilized acetaldehyde composition was utilized as a flavor enhancer in dry fruit flavored beverage mixes and provided superior taste enhancement in the resulting beverages without any adverse taste or effects upon use immediately after preparation and retained this characteristic after the above storage periods.

EXAMPLE 2

Using the procedure of Example 1 the following materials were utilized to form stable acetaldehyde compositions:

| | Parts |
|---|---|
| Acetaldehyde | 30 |
| Lactose ($\alpha$) | 50 |
| Starch hydrolysate (Morrex 1918) | 228 |
| 2% PGA aqueous solution (Kelcoloid S) | 50 |
| Water | 120 |

The resulting spray-dried material had 6.2% acetaldehyde after spray drying and leveled off at 5.6 to 5.7% after six months storage. Its performance as a flavor enhancer was comparable to the material prepared in Example 1.

EXAMPLE 3

Using the procedure of Example 1 the following materials were utilized to form stable acetaldehyde compositions:

| | Parts |
|---|---|
| Acetaldehyde | 30.0 |
| Lactose ($\alpha$) | 50 |
| Water | 38.4 |
| 2% guar gum solution | 150.0 |
| Starch Hydrolysate (Morrex 1918) | 247.8 |

The resulting spray-dried material had 8.5% acetaldehyde after spray-drying.

Representative of the many flavoring agents which can be used in the practice of this invention are, in addition to acetaldehyde, grape, orange, cranberry, lemon and lime extracts, imitation strawberry, imitation raspberry, imitation cherry, imitation peach, imitation pineapple, imitation lemon, imitation lime and the like. Particularly preferred are those flavoring agents capable of rapid dissolution in aqueous solutions.

While the invention has been described herein with regard to certain specific embodiments, it is not so limited. Furthermore, the terms and expressions that have been employed are used as terms of description and not of limitation. There is no intention in the use of such terms and expressions of excluding any equivalents of the features shown and described or portions thereof. It is to be understood that variations and modifications are possible without departing from the spirit and scope of the claimed invention.

I claim:
1. A composition comprising a flavoring agent fixed in a matrix material comprising lactose, hydrocolloid gum and a starch hydrolysate having a D.E. of from about 5 to about 20.
2. A composition of claim 1 that comprises from about 1 to about 85% lactose, from about 0.05 to about 2.0% hydrocolloid gum and from about 15 to about 98% starch hydrolysate based on the total weight of the lactose, hydrocolloid gum and starch hydrolysate in the composition.
3. A composition of claim 2 that comprises from about 5 to about 50% lactose, from about 0.3 to about 1.3% hydrocolloid gum and from about 45 to about 95% starch hydrolysate.
4. A composition of claim 1 wherein the starch hydrolysate has a D.E. of from about 7 to about 13.
5. A composition of claim 1 wherein the hydrocolloid gum is propylene glycol alginate.
6. A dry-mix type food product containing the composition of claim 1.
7. A composition of claim 1 wherein the flavoring agent is acetaldehyde.
8. A fruit flavored dry beverage base containing the composition of claim 7.
9. A process comprising forming an aqueous solution of lactose, hydrocolloid gum, a starch hydrolysate having a D.E. of from about 5 to about 20 and a flavoring agent wherein the total non-aqueous materials are present in an amount of from about 40 to about 65% of the aqueous solution wherein the non-aqueous materials comprise, based on the total weight of the lactose, hydrocolloid gum and starch hydrolysate, from about 1 to about 85% lactose, from about 0.05 to about 2.0% hydrocolloid gum and from about 15 to about 98% starch hydrolysate and subsequently drying the aqueous solution so that the flavoring agent is fixed in a solid matrix material comprised of the lactose, hydrocolloid gum and starch hydrolysate.
10. A process according to claim 9 wherein the aqueous solution contains from about 45 to about 60% non-aqueous materials.
11. A process according to claim 9 wherein there is present from about 5 to about 50% lactose, from about 0.3 to about 1.3% hydrocolloid gum and from about 45 to about 95% starch hydrolysate.
12. A process according to claim 9 wherein the hydrocolloid gum is propylene glycol alginate.
13. A process according to claim 9 wherein the flavoring agent is acetaldehyde.

References Cited

UNITED STATES PATENTS

| 3,554,768 | 1/1971 | Feldman | 99—140 |
| 3,482,988 | 12/1969 | Kaleda | 99—140 X |
| 3,264,114 | 8/1966 | Glicksman et al. | 99—140 X |
| 3,436,224 | 4/1969 | Bode | 99—140 X |

OTHER REFERENCES

Chemicals Used in Food Processing, National Academy of Sciences-National Research Council, Washington, D.C., p. 31.

MORRIS O. WOLK, Primary Examiner

S. MARANTZ, Assistant Examiner

U.S. Cl. X.R.

99—140 R, 141

CERTIFICATE OF CORRECTION

Patent No. 3,736,149  Dated May 29, 1973

Inventor(s) William A. Knapp

It is certified that error appears in the above-identified patent and that said Letters Patent are hereby corrected as shown below:

Column 5, line 32, "228" should be - - 220 - - -

Column 5, line 47, "50" should be - - 19.2 - - -

Signed and sealed this 25th day of December 1973.

(SEAL)
Attest:

EDWARD M. FLETCHER, JR.
Attesting Officer

RENE D. TEGTMEYER
Acting Commissioner of Patents